United States Patent
Dong et al.

(10) Patent No.: US 8,467,983 B2
(45) Date of Patent: Jun. 18, 2013

(54) METHOD FOR DETECTING CONFLICTS BETWEEN OUTAGE REQUESTS AND POWER SUPPLY GUARANTEE REQUESTS IN A POWER GRID

(75) Inventors: Jin Dong, Beijing (CN); Feng Jin, Shanghai (CN); Hai Rong Lv, Beijing (CN); Qi Ming Tian, Beijing (CN); Wen Jun Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/541,448

(22) Filed: Jul. 3, 2012

(65) Prior Publication Data

US 2012/0290233 A1 Nov. 15, 2012

Related U.S. Application Data

(63) Continuation of application No. 13/024,737, filed on Feb. 10, 2011.

(30) Foreign Application Priority Data

Feb. 11, 2010 (CN) .......................... 2010 1 0113692

(51) Int. Cl.
*G01R 21/00* (2006.01)

(52) U.S. Cl.
USPC .......................................................... 702/62

(58) Field of Classification Search
USPC .......................................................... 702/62
See application file for complete search history.

(56) References Cited

U.S. PATENT DOCUMENTS

| 5,568,399 | A | 10/1996 | Sumic |
| 7,844,370 | B2 * | 11/2010 | Pollack et al. ............... 700/291 |
| 2003/0041016 | A1 | 2/2003 | Spool et al. |

FOREIGN PATENT DOCUMENTS

EP 2081273 A2 7/2009

OTHER PUBLICATIONS

Chengmin Wang et al., "Power distribution network planning scheme assistant decision system", CN101179195A English Abstract, May 14, 2008, University Shanghai Jiaotong, 2 pages.

Brancaccio et al., "System and method for providing power distribution system information", EP2081273A2 English Abstract, Jul. 22, 2009, Current Comm Services LLC, 2 pages.

Chinese Office Action Document 100037, 20100113692.2, Dated: Mar. 25, 2013, pp. 1-5. (This Chinese application is related to U.S. Appl. No. 13/541,448).

* cited by examiner

*Primary Examiner* — Stephen Cherry
(74) *Attorney, Agent, or Firm* — Cynthia G. Seal; Jeffrey L. Streets

(57) ABSTRACT

A method detects conflicts between a power supply guarantee request (PSGR) and an outage request (OR) in a power grid. The method comprises receiving a first outage device set including OR related devices and a power supply guarantee device set including PSGR related devices. Geographic information about devices in the power grid is used to determine a second outage device set, which includes devices in the first outage device set and accompanying outage devices that need to be in outage together with devices in the first outage device set. Power grid topology information is used to determine a power grid outage scale in which all devices in the second outage device set can be in outage. For each device in the power supply guarantee device set, the method detects whether the device is included in the power grid outage scale, to determine any conflict between the PSGR and OR.

11 Claims, 9 Drawing Sheets

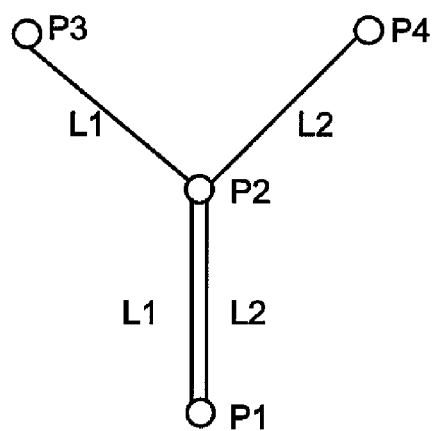
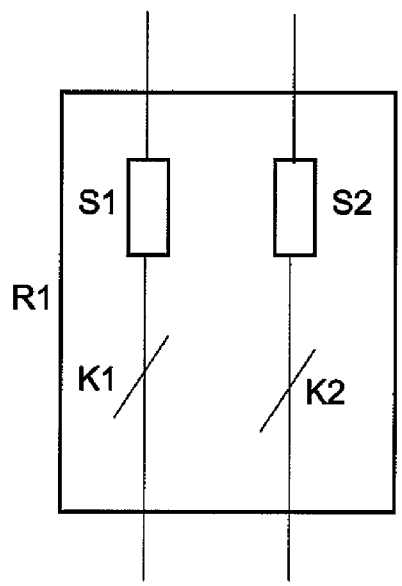
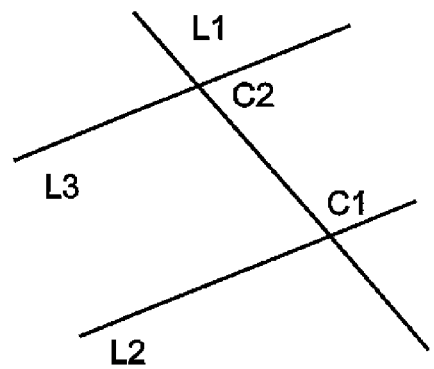
FIG.5

METHOD FOR DETECTING CONFLICTS BETWEEN OUTAGE REQUESTS AND POWER SUPPLY GUARANTEE REQUESTS IN A POWER GRID

CROSS-REFERENCE TO RELATED APPLICATIONS

This application is a continuation of U.S. patent application Ser. No. 13/024,737 filed on Feb. 10, 2011, which claims priority under 35 U.S.C. §119 to Chinese Patent Application No. 201010113692.2 filed on Feb. 11, 2010, the entire text of which is specifically incorporated by reference herein.

BACKGROUND OF THE INVENTION

1. Field of the Invention

The present invention generally relates to a power grid, and more specifically, to a method for detecting conflicts between outage requests and power supply guarantee requests in a power grid.

2. Background of the Related Art

With the acceleration of the use of electricity in the whole of society and the market development of the electric power industry, people increasingly rely on electric power. The power grid is a key component of an electric power system, and plays the role of transmitting a large capacity of power. In order to transmit electric power more reliably and efficiently, the concept of a "smart grid" has been proposed in recent years. Based on the so-called smart grid, a large number of new techniques are applied in power generating, power transmitting, power distributing, power using and etc., to optimize the configuration of the power grid, save energy and reduce emissions. Intelligent Outage Plan Management is an important part of the smart grid, which helps to manage outages in the grid more efficiently.

Power grid companies usually need to handle power supply guarantee requests (PSGR) and outage requests (OR). For example, in order to perform ordinary maintenance or technical renovation/upgrade, or coordinate with municipal reconstruction, power grid companies need to stop or cut off the electric power of certain electric power devices to ensure the safety of workers. A request to cut off the power supply to an electric power device is referred to as an Outage Request. On the other hand, power grid companies need to guarantee the power supply for some important events or users. Important events for example include a college entrance examination or an important conference. Important users for example include government departments and special industry users (e.g. iron and steel factory). A request to guarantee the power supply for an electric power user is referred to as a Power Supply Guarantee Request (PSGR).

An outage request may be related to electric power devices including a transformer, power line, breaker, bus bar, secondary device, etc. A power supply guarantee request usually relates to the guarantee of power supply for an organization or event, however, the organization or event is associated with fixed buildings or facilities. Therefore, power supply guarantee requests related to electric power devices mainly refer to distribution transformers associated with buildings or facilities requiring the power supply guarantee. As long as it is guaranteed that the power to a corresponding distribution transformer will not be cut off, it can guarantee the power supply for one or more buildings or facilities associated with this distribution transformer.

In practice, PSGRs and ORs often have conflicts. Power grid companies need to judge if the fulfilling of an OR will cause a conflict with a PSGR, and adjust an operating mode to ensure the PSGR as much as possible.

An example of a conflict arising between PSGR and OR in a power grid is illustrated in FIG. 1. In FIG. 1, hexagons refer to users, lines refer to power lines, and user C is a user with a PSGR. In the event of maintaining line L1, the power supply for line L1 should be cut off. In addition, since line L2 and line L1 intersect with each other geographically, prior to the actual maintenance, in order to ensure safety when performing maintenance for line L1, the power supply to line L2 has to be cut off at the same time. On the other hand, due to the outage of line L2, it can be judged from FIG. 1 that power supply to users B and C both will be cut off, which obviously will produce a conflict with the PSGR for user C.

At present, power grid companies store received ORs and PSGRs in a power grid management information system. FIG. 2 schematically shows an example of all the PSGRs and ORs in a certain month, wherein each request lasts for a period of time. There are a plurality of ORs in FIG. 2, and in accordance with these ORs, for example, it is necessary to perform an outage for "line 5114" from the first day to the fifth day, to perform an outage for the "500 kV Bus Bar" from the fourth day to the eighth day, and to perform an outage for "No. 2 main transformer" from the twenty-first day to the twenty-fifth day, and so forth. There are also six PSGRs in FIG. 2. These PSGRs include user power supply guarantees, conference power supply guarantees and event power supply guarantees, each power supply guarantee lasting for several days. Though time related to ORs and PSGRs in FIG. 2 is in the unit of day, obviously, the time related to these requests can also be in the units of hours or minutes, etc. For example, one OR or PSGR can last from 20:05 in the first day to 8:30 in the third day precisely. Judging whether performing an outage for specific electric power devices in accordance with ORs will produce a conflict with PSGRs based on time points, has become a problem that power grid companies should resolve.

Traditionally, conflicts are detected manually. Grid dispatchers need to explore manually over the power grid topology and judge separately whether an OR will cause a conflict with a PSGR. This manual detection is based on power grid topology. However, the scale of grid is getting increasingly large. So, grid topology is becoming more and more complex. Therefore manual detection will consume much time. In addition, because the judgment is made manually, reliability can not be guaranteed and some conflicts might be missed.

In addition, there is system aided detection. The system aided detection is based on management information system (MIS) that uses simple name matching to verify if a PSGR device is among OR devices. That is, this system aided detection verifies if the PSGR device's name is among OR devices' name list. If the PSGR device's name is among OR devices' name list, then a conflict is detected. This system aided detection does not take grid topology into account. The scope of an outage is not limited to OR related outage devices, but extends from said outage device outwardly until reaching switches (or terminals or ground nodes). Therefore, the actual scope of an outage includes electric power devices not within the above outage devices' name list. In this case, even if a PSGR device is not among outage devices' name list, it may be affected by the actual outage. Thus, the system aided detection, in accordance with the prior art, is not reliable.

BRIEF SUMMARY OF THE INVENTION

Another embodiment of the present invention provides a method for detecting conflicts between PSGRs and ORs in a power grid, comprising: receiving a first outage device set including OR related devices and a power supply guarantee device set including PSGR related devices; using geographic information of devices in the power grid to determine a second outage device set, the second outage device set including devices in the first outage device set and accompanying outage devices that need to be in outage together with devices in the first outage device set; using topology information in the power grid to determine a power grid outage scale in which all of the devices in the second outage device set can be in outage; and detecting for each device in the power supply guarantee device set if the device is included in the power grid outage scale, to determine if there is a conflict between the PSGR and the OR.

BRIEF DESCRIPTION OF THE SEVERAL VIEWS OF THE DRAWINGS

FIG. 5 includes three diagrams of geographical relationships of electric power devices in a power grid.

DETAILED DESCRIPTION OF THE INVENTION

Figure 1:
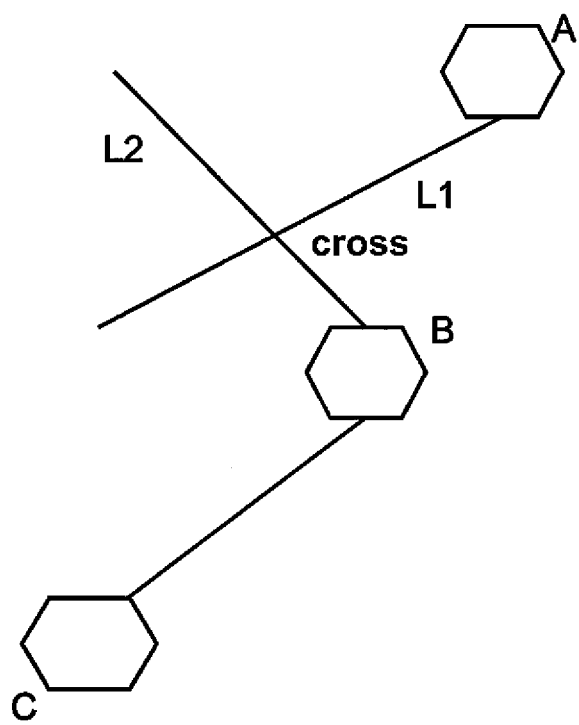
FIG. 1 is a diagram of an example conflict arising between PSGR and OR in a power grid.

The inventor has found that, because there is a complex relationship between PSGRs and ORs, in order to find the conflicts between PSGRs and ORs, many factors should be considered. For example, at least three factors below should be considered: topology connectivity of the power grid, geographical relationship of electric power devices, and the time sequence of PSGRs and ORs. For example, the time sequence of PSGRs and ORs can be stored and expressed in the form of table illustrated by FIG. 2. Of course, the time sequence can also be expressed by other data structures.

The topology connectivity of a power grid refers to a topology relationship between electric power devices, such as a power source, line, bus bar, transformer, switch, ring main unit, etc. In order to determine the scope of an outage corresponding to an OR, the topology connectivity of the power grid must be taken into account.

The geographical relationship of electric power devices comprises, but not limited to, the same pole, the same room and cross. The same pole relationship refers to a relationship between lines spanned in parallel on the same pole. The same room relationship refers to a relationship between electric power devices in a room constructed for accommodating electric power devices, located in transformer stations or other sites. The cross relationship refers to a relationship between lines intersecting with each other geographically. The reason for taking the above three geographical relationships into account is that, in the event of maintaining electric power devices, if one line on a pole is to be maintained, power supplies for the line and other lines on the pole are also to be cut off so as to ensure safety. Similarly, if one electric power device in a room is to be maintained, power supplies for the electric power device and other electric power devices in the room are also to be cut off. If one line among lines intersected with each other is to be maintained, power supplies for the line and the other line intersected with it are also to be cut off.

Specific embodiments of the invention will be explained in detail by referring to the drawings hereinafter. In the following description, the terms "outage scale/grid outage scale" refer to a set of electric power devices being powered off in a specific operating mode. The set is different from the set of devices desired to power off according to OR. The former is obtained by expanding the latter. Because, as mentioned above, operating modes refer to modes at which power grid operates in one switch state combination of respective switches in the power grid, an "outage scale" actually corresponds to one switch state combination of respective switches in the power grid.

Figure 3:
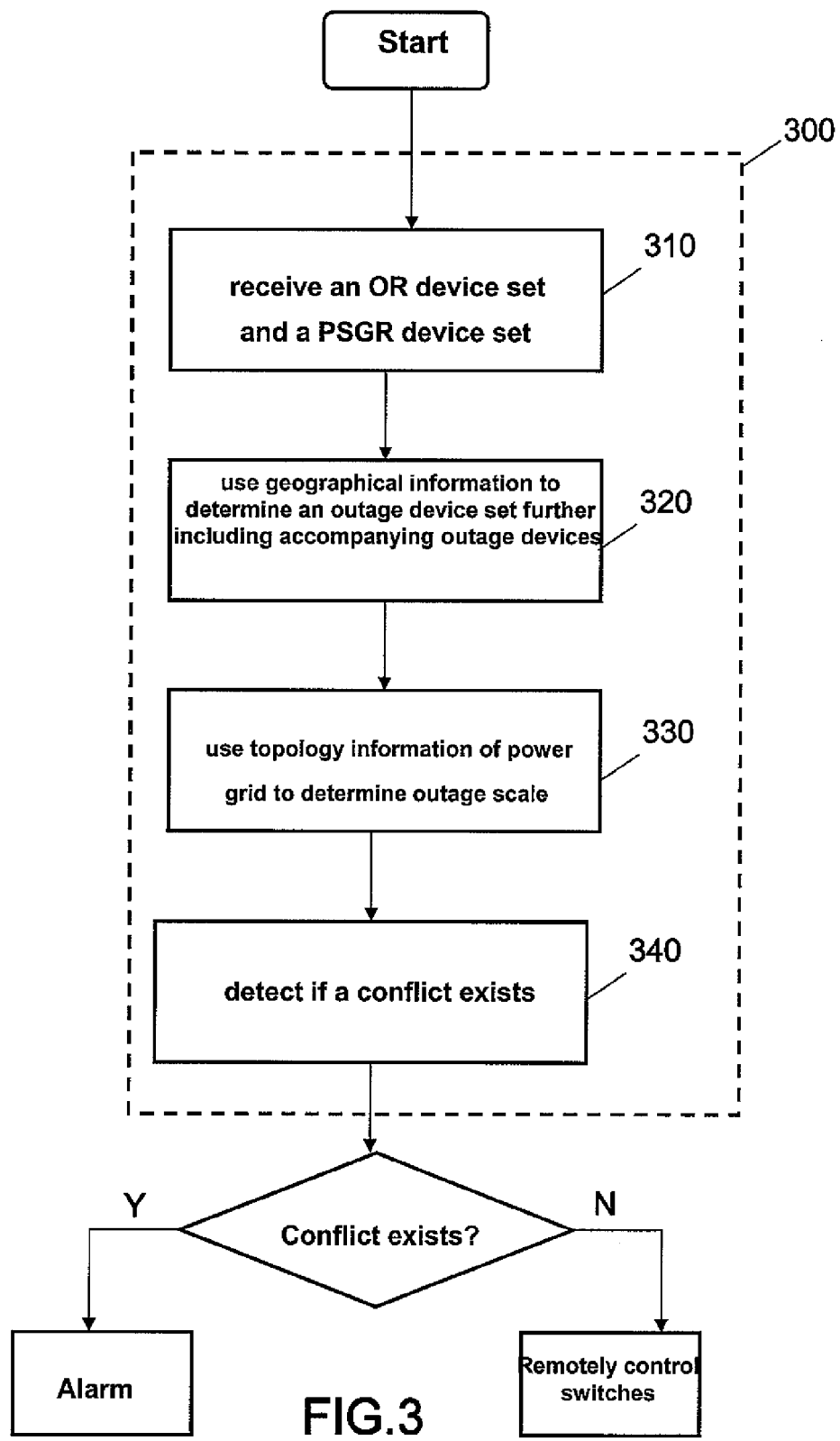
FIG. 3 is a flow chart of a conflict detection method according to first embodiment of invention.

Referring to FIG. 3, the invention provides a method of detecting conflicts between PSGRs and ORs in a power grid. FIG. 3 illustrates a process flow 300 used by the first embodiment of invention, comprising the following steps:

Step 310: receiving an OR device set and a PSGR device set.

Step 320: using geographical information to determine an outage device set further including accompanying outage devices.

Step 330: using topology information of power grid to determine the outage scale or scope.

Step 340: detecting if a conflict exists.

Note that the process flow 300 should be performed at certain points in time, including the power supply guarantee start timing, the power supply guarantee end timing, outage start timing and outage end timing located between power supply guarantee start timing and power supply guarantee end timing. In this manner, taking the PSGR, "user PSGR 1" in FIG. 2, as an example, process flow 300 is preferably performed at the following time points: start and end timings of PSGR "user PSGR 1", end timing of OR "5114 line", start timing of OR "500 kV bus bar", end timing of OR "500 kV secondary bus bar", and start timing of OR "No. 2 power line/No. 2 common spare transformer". However, it is not necessary to perform the method 300 at each of these timings. Rather, the process flow 300 can be performed once per day or per hour, and the performing timings for process flow 300 are not limited.

Hereinafter, in order to explain the process flow 300 in FIG. 3, FIG. 4 introduces a schematic diagram of simple power grid. It should be understood that power grids in the real world are much more complex than the power grid in FIG. 4, and that this schematic diagram is being provided only for those skilled in the art to understand the principle of invention easily, and it should not be construed as a limitation to the invention.

Figure 4:
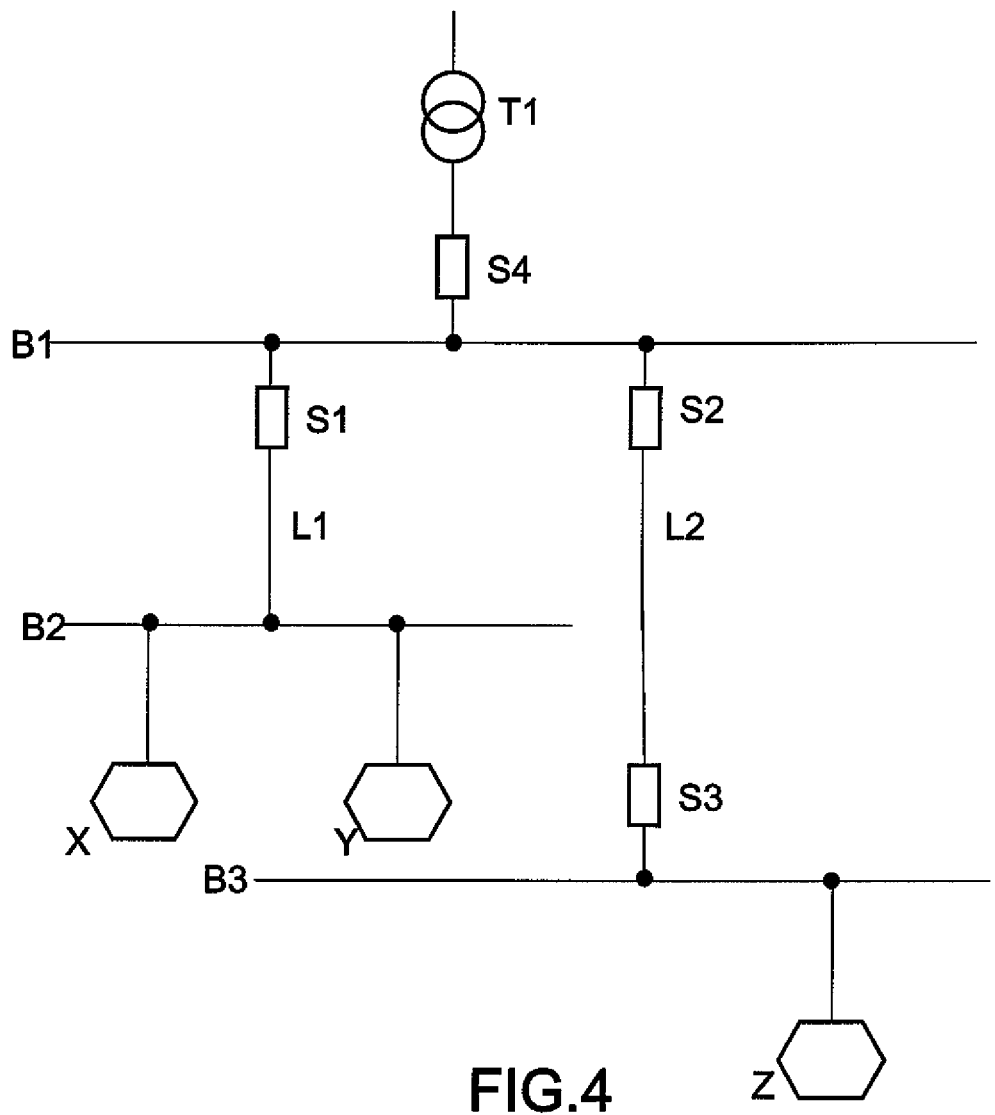
FIG. 4 is a schematic diagram of a power grid using a conflict detection method according to first embodiment of invention.

In FIG. 4, T1 refers to a main transformer; S1, S2, S3, S4 refer to switches; B1, B2, B3 refer to bus bars; L1, L2 refer to lines; and X, Y, Z refer to users (distribution transformers associated with users in practice), wherein the main transformer T1 is connected to a power source line in the upper side. Hereinafter, process flow 300 will be described in detail in conjunction with the example of the power grid in FIG. 4.

Step 310: receiving an outage device set and a PSGR device set.

Figure 2:
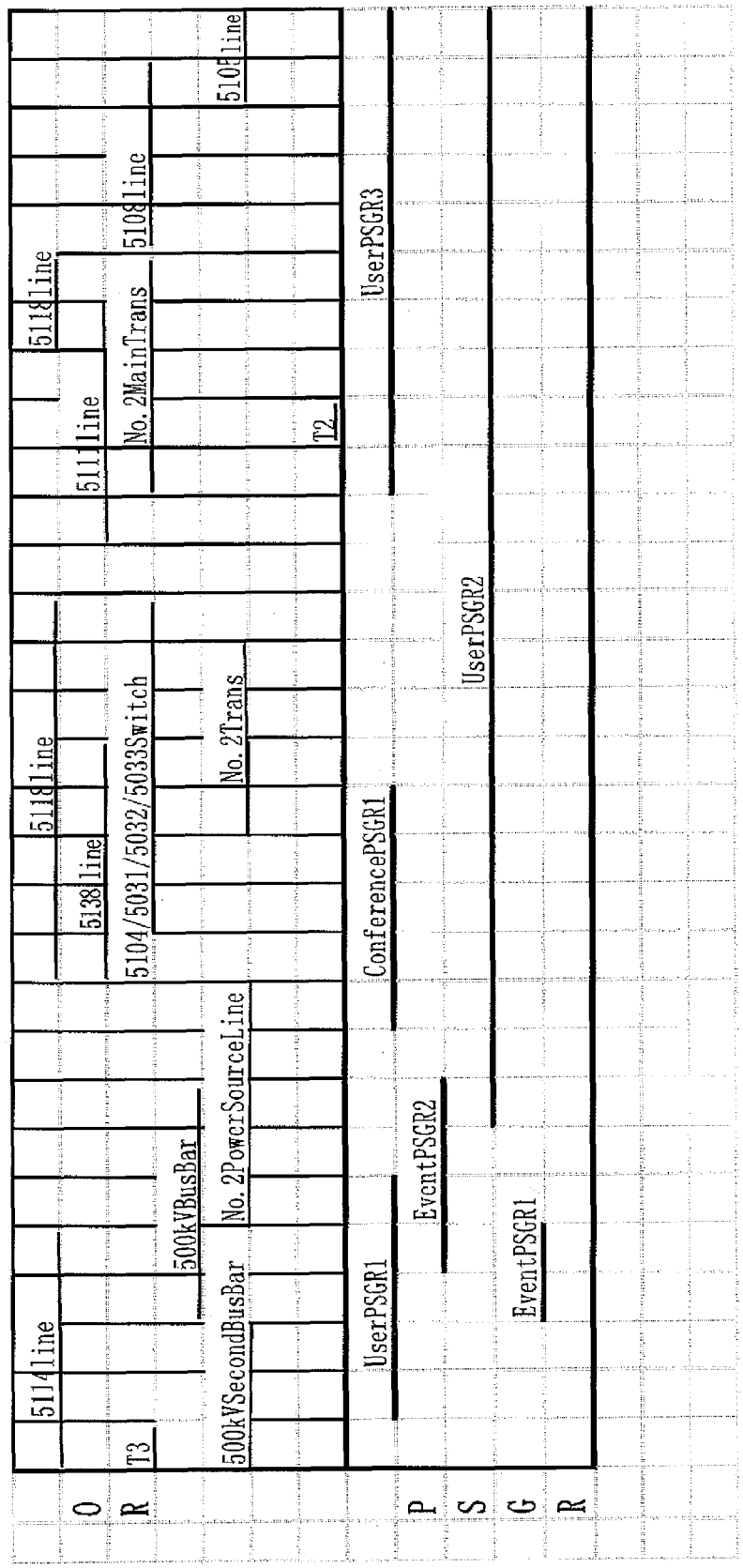
FIG. 2 is an example of a calendar showing all of the PSGR and OR during a month.

When beginning to perform the process flow 300 at a certain time point, for example, an outage device set and a PSGR device set are received or obtained from a power grid management information system. Respective PSGRs and ORs are stored in the existing power grid management information system. PSGRs and ORs are stored in or by the power grid management information system, for example, in the form of a table shown in FIG. 2. Of course, PSGRs and ORs can be stored in the form of another data structure, for example stored in a database. As described above, each of the PSGRs and ORs relates to one period of time. The PSGRs and ORs that should be considered during performance of the process flow 300, are those PSGRs and ORs that are effective for a given time period. Referring to FIG. 2, for example when performing process flow 300 on the twenty-eighth day, only OR "5108 line" and PSGR "user PSGR 2" and "user PSGR 3" need to be considered. Thus, PGSRs and ORs hereinafter only refer to requests that are effective when performing the method of invention.

An outage device set includes OR related devices. A PSGR device set includes PSRG related devices. Though only names of PSGRs are listed in PSGR portion in FIG. 2, with respect to each PSGR, the PSGR related device is a specific distribution transformer.

To continue with the present example, assume that line L1 in FIG. 4 needs to be maintained on a particular day (as represented by an OR), however the power supply to the distribution transformer Z needs to be guaranteed on that same day (as represented by a PSGR) because distribution transformer Z is associated with a college planning a examination on that day. In this case, the outage device set received from power grid management information system, in association with the OR, is {L1}, and the PSGR device set received from power grid management information system, in association with the PSGR, is {Z}. The situations illustrated above are only for purpose of simplifying the description and in practice there may exist a plurality of ORs and PSGRs at the same time point.

Step 320: Using Geographical Information to Determine an Outage Device Set Further Including Accompanying Outage Devices.

After the outage device set is obtained, geographical information of devices in the power grid is used to determine accompanying outage devices, and the accompanying outage devices are also added to the outage device set.

Hereinafter, geographical information will be briefly explained. Geographical information is stored in a power grid geographical information system which is a part of the power grid management information system. The geographical information may be geographical coordinates of respective electric power devices, and also may include geographical relationship of electric power devices obtained after processing the geographical coordinates of the electric power devices.

For example, with respect to a "same pole relationship", referring to line spanning example in FIG. 5A, a multiple-to-multiple geographical relationship is expressed as follows: L1↔{P1,P2,P3}, L2↔{P1,P2,P4}, P1↔{L1,L2}, P2↔{L1,L2}, P3↔{L1}, and P4↔{L2}. The geographical relationship above indicates that line L1 is spanned on poles P1, P2, P3, line L2 is spanned on poles P1, P2, P4, poles P1 and P2 have line L1 and line L2 spanned thereon, pole P3 has line L1 spanned thereon, and pole P4 has line L2 spanned thereon.

Similarly, with respect to a "same room relationship", referring to FIG. 5B, a multiple-to-one geographical relationship is expressed as follows: S1↔{R1}, S2↔{R1}, K1↔{R1}, K2↔{R1}, R1↔{S1,S2,K1,K2}. The relationship indicates that switches S1, S2 and knifes K1, K2 are in room R1, and room R1 has switches S1, S2 and knifes K1, K2.

Similarly, with respect to a "cross relationship", referring to FIG. 5C, a multiple-to-multiple geographical relationship is indicated as follows: L1↔{C1,C2}, L2↔{C1}, L3↔{C2}, C1↔{L1,L2}, C2↔{L1,L3}. The relationship above indicates that there are two cross points C1 and C2 in L1, there is one cross point C1 in L2, and there is one cross point C2 in L3, cross point C1 is formed by line L1 and line L2, and cross point C2 is formed by line L1 and line L3.

For example, the above geographical relationships are stored in a database of a power grid geographical information system in the form of a relational table.

At step 320 of the process flow 300, with respect to each device in the original outage device list, if the device is a power line, then the "same pole" accompanying outage analysis and the "cross" accompanying outage analysis are performed, and if the device is a transformer device, then the "same room" accompanying outage analysis is performed. Hereinafter, the "same pole" accompanying outage analysis, "cross" accompanying outage analysis and "same room" accompanying outage analysis will be described in detail.

Same pole accompanying outage analysis:
1. With respect to the current device (in this case, line L1) in the outage device set, a pole list of the line is obtained in accordance with the geographical information. For example, with respect to the case in FIG. 5A, on the assumption that an original outage device set is {a,b,c,L1} (wherein a, b, c are other devices for outage) and L1 is the current device in outage device set, then here the pole list {P1,P2,P3} is obtained in accordance with geographical relationship L1↔{P1,P2,P3}.
2. With respect to each pole in the pole list (in the case of FIG. 5A, the pole list includes P1, P2, P3), lines spanned on the respective poles are found. For example, as to the case in FIG. 5A, lines L1 and L2 are found in accordance with geographical relationships P1↔{L1,L2}, P2↔{L1,L2}, P3↔{L1}.
3. The lines found are added to the outage device set. For example, as to the case in FIG. 5A, an outage device set {a,b,c,L1,L1,L2} is obtained.
4. The repeated elements in the new outage device set are removed. For example, with respect to the case in FIG. 5A, an outage device set {a,b,c,L1,L2} is obtained, wherein L2 is an accompanying outage device of L1.

Cross accompanying outage analysis:
5. With respect to the current device (in this case, line L1) in the outage device set, a cross point list associated with the line is obtained. For example, with respect to the case in FIG. 5C, on the assumption that an original outage device set is {a,b,c,L1} and L1 is the current device in outage device set, then the cross points list {C1,C2} is obtained in accordance with the geographical relationship L1↔{C1,C2}.
6. With respect to each cross point in the cross point list (in case of FIG. 5C, the cross points are C1, C2), lines forming each cross point are found. For example, with respect to the case in FIG. 5C, lines L1, L2 and L3 are obtained in accordance with geographical relationship C1↔{L1,L2}, C2↔{L1,L3}.
7. The lines found are added to the outage device set. For example, with respect to the case in FIG. 5C, an outage device set {a,b,c,L1,L1,L2,L3} is obtained.
8. Repeated elements in the new outage device set are removed. For example, with respect to the case in FIG.

5C, an outage device set {a,b,c,L1,L2,L3} is obtained, wherein L2 and L3 are accompanying outage devices of L1.

Same room accompanying outage analysis:

9. With respect to the current device in the outage device set (in this case, a transformer device), a room associated with the device is obtained in accordance with geographical information. For example, with respect to the case in FIG. 5B, on the assumption that the original outage device set is {a,b,c,S1} and S1 is the current device in the outage device set, then the room R1 is obtained in accordance with geographical relationship S1↔{R1}.
10. With respect to the obtained room (in the case of FIG. 5B, the obtained room is R1), electric power devices in the room are found. For example, with respect to the case in FIG. 5B, switches S1, S2 and knifes K1, K2 are found in accordance with the geographical relationship R1 ↔ {S1,S2,K1,K2}.
11. The devices found are added to the outage device set. For example, with respect to the case in FIG. 5B, an outage device set {a,b,c,S1,S1,S2,K1,K2} is obtained.
12. Repeated elements in the new outage device set are removed. For example, with respect to the case in FIG. 5B, an outage device set {a,b,c,S1,S2,K1,K2} is obtained, wherein S2, K1, and K2 are accompanying outage devices of S1.

A final outage device set is obtained after the above processing is performed for each device in the original outage device set. The final outage device set includes the devices in the original outage device set, as well as accompanying outage devices that are needed to be cut off with the devices in the original outage device set.

Now, returning back to refer to the example in FIG. 4, consider the example where line L1 and line L2 have a same pole relationship, that is, poles spanned with line L1 and poles spanned with line L2 have same poles. With respect to device L1 in the original outage device set, line L2 having a same pole relationship with L1 can be found as an accompanying outage device in accordance with the above same pole accompanying outage analysis. Thus, with respect to the example in FIG. 4, after step 320 is performed, the final outage device set is {L1,L2}.

Step 330: Using Topology Information of Power Grid to Determine Outage Scale.

After the final outage device set is obtained, a search is performed with respect to each device in the final outage device set, wherein the search is performed based on the topology of the power grid by starting from the device. If the device is a line, then the search is continued until a switch or terminal is found; if the device is a transformer device, then the search is continued until a switch or a ground node is found. The search may be a depth-first search or a width-first search, but preferably is a width-first search. Topology information of the power grid is the connection relationship of the devices in the power grid, and the information is the basic information in the power grid management information system.

A switch set is obtained by the above search. For example, with respect to the case in FIG. 4, the final outage device set is {L1,L2}. A search is performed along the topology connection starting from L1, and switch S1 can be obtained. The search is performed along the topology connection starting from L2, and switches S2 and S3 can be obtained.

In the present embodiment, an operating mode, in which all the searched switches (S1, S2, S3 in FIG. 4) are switched off, is utilized by default, so as to guarantee that all the devices in the final outage device set are in outage.

Secondly, in an operating mode in which all the searched switches are switched off (basic operating mode), the power grid outage scale is determined by a coloring algorithm in graph theory, and the power grid outage scale can make all of the devices in the final outage device set be in outage. The coloring algorithm in graph theory is a well known algorithm. Coloring with a first color is performed along a connected path with respect to devices connected to any power source, based on the topology of the power grid and the current operating mode (switch state combination), and coloring with a second color is performed with respect to other devices. Finally, the portion colored with the second color in the power grid is the outage scale. Because the coloring algorithm is a common known algorithm in the art, the detailed description for it is omitted here.

By performing the coloring algorithm, in an operating mode in which switches S1, S2, S3 are all switched off, the outage scale of power grid in FIG. 4 is {L1,L2,B2,B3,S3,X,Y,Z}. Because one end of switches S1 and S2 is connected to bus bar B1 with power, S1 and S2 are not included in the outage scale according to coloring algorithm.

Step 340: Detecting if a Conflict Exists.

After the outage scale is determined, a detection is performed for each device in a power supply guarantee device set to judge whether the device is included in the outage scale, so as to determine if there is a conflict between a PSGR and a OR.

With respect to the example in FIG. 4, power supply guarantee device set is {Z}, and the outage scale obtained by the processing of steps 310 to 330 is {L1,L2,B2,B3,S3,X,Y,Z}. If any device in the power supply guarantee device set is included in the power grid outage scale, then it is detected that there is a conflict. Here, device Z in power supply guarantee device set is also in the outage scale, so it is detected that a conflict exists between the PSGR and the OR at the current time point.

After process flow 300 is completed, when it is detected that there is a conflict, for example, an alarm may be given and then the dispatcher may adjust the outage plan to avoid the conflict manually. On the other hand, if it is detected that there is not a conflict, then switches searched in step 330 (in the example of FIG. 4, S1,S2,S3) are remotely controlled at the planned timing to switch off these switches and to achieve outage according to said power grid outage scale, so that a completely automatic control is achieved.

Figure 6:
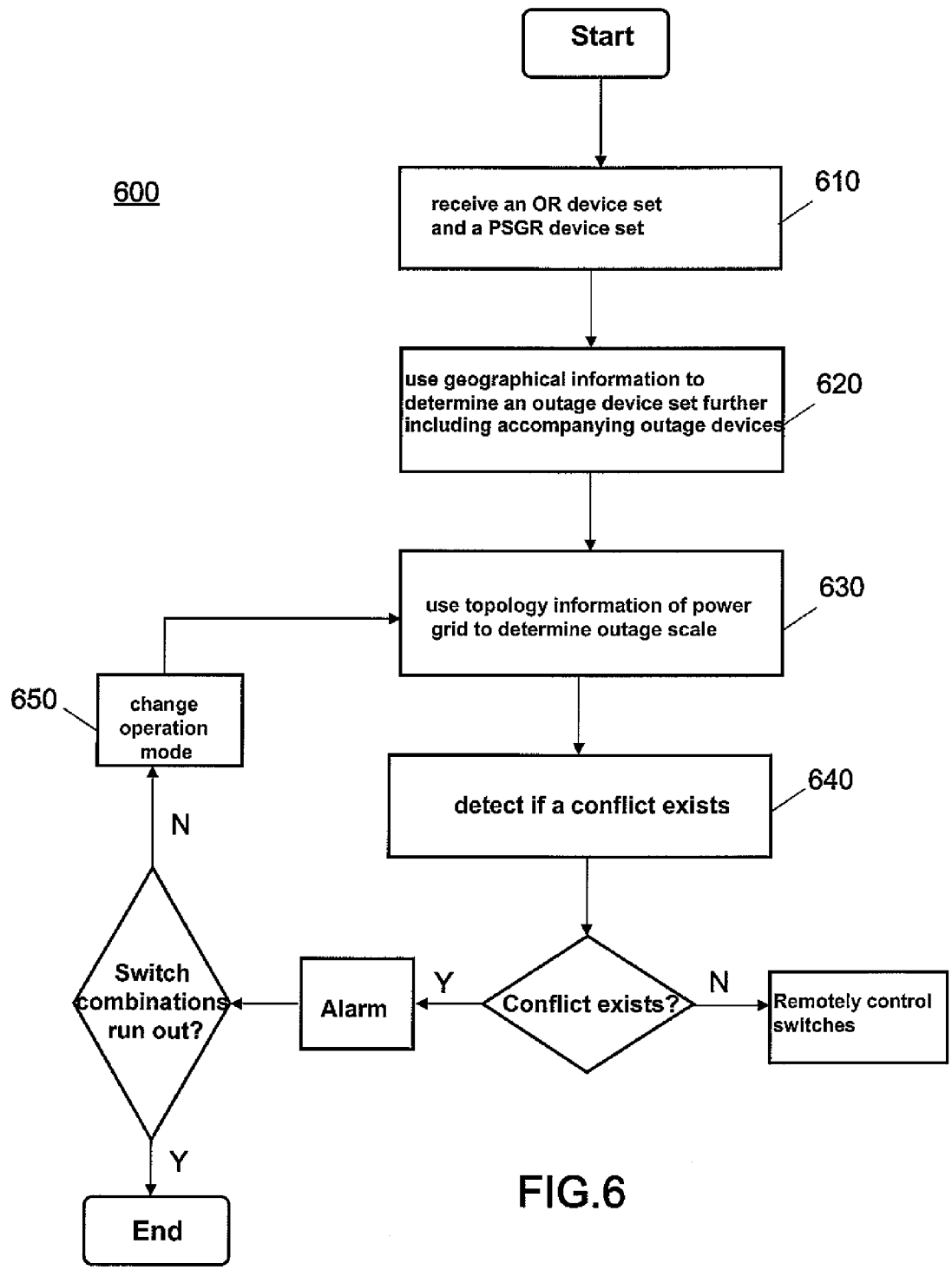
FIG. 6 is a flow chart of a conflict detection method according to a second embodiment of invention.

Hereinafter referring to FIG. 6, a process flow 600 used by the second embodiment of invention is illustrated. The process flow 600 in FIG. 6 is substantially the same as process flow 300 in FIG. 3, and processing in steps 610, 620, 640 in process flow 600 is the same as that in steps 310, 320, 340 in process flow 300 completely. Performing timings of process flow 600 are also the same as those of process flow 300. The difference between process flow 600 and process flow 300 is that process flow 600 further comprises step 650, and except the first run, step 630 in process flow 600 is different from step 330 in process flow 300.

Figure 7:
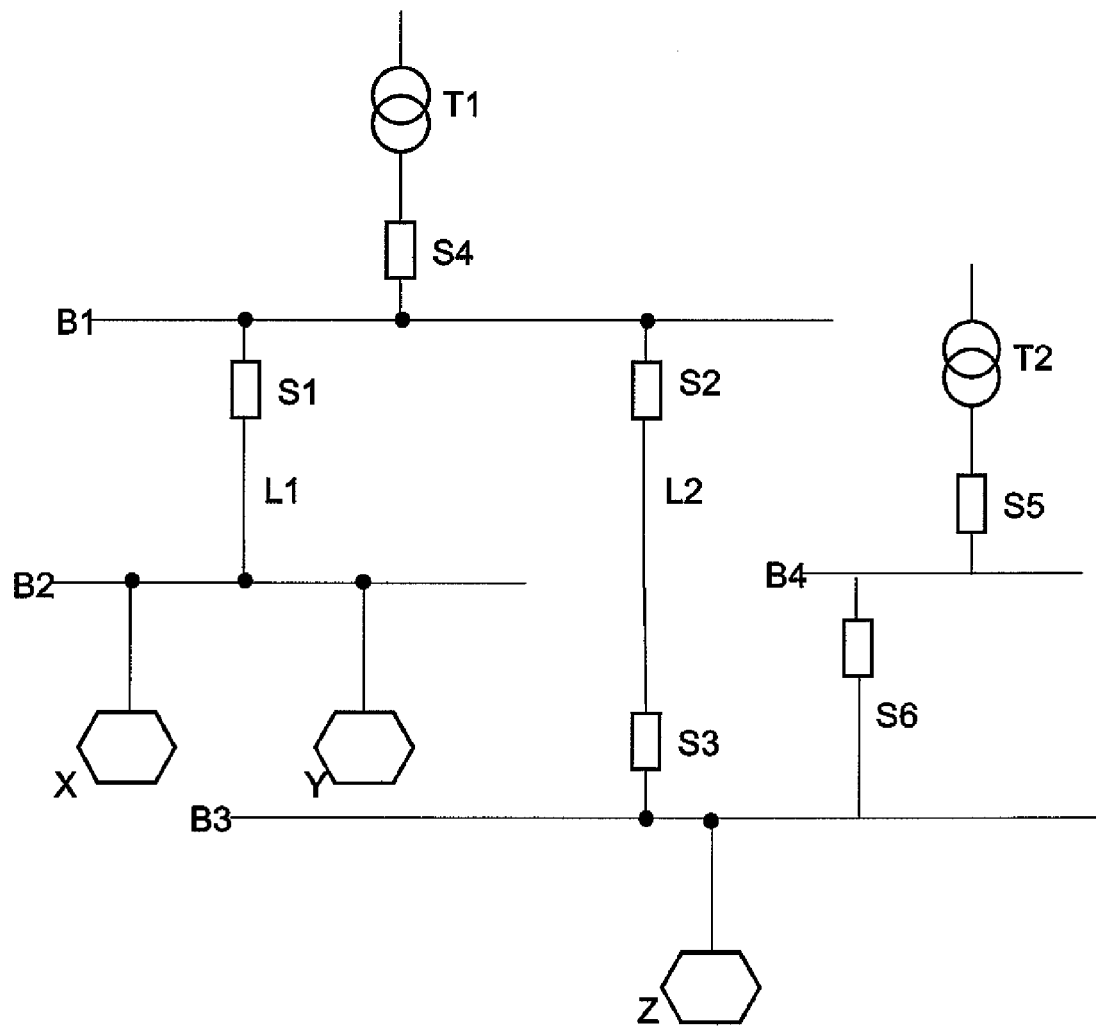
FIG. 7 is a schematic diagram of a power grid used to set forth a conflict detection method according to second embodiment of invention.

Hereinafter, FIG. 7 is referenced to explain the process flow 600 in FIG. 6. Relative to FIG. 4, FIG. 7 adds a main transformer T2, bus bar B4 and switches S5 and S6, wherein the upside of main transformer T2 is also connected to a power source line. The remaining portion of the power grid example in FIG. 7 is the same as the power grid example in FIG. 4. Process flow 600 of the invention will be explained in detail in conjunction with the power grid example in FIG. 7 hereinafter.

It is assumed that in step 610, the outage device set {L1} and the power supply guarantee device set {Z} are received, as in the first embodiment.

In the same manner as step 320, in step 620, the final outage device set {L1,L2} is obtained, wherein L2 is an accompanying outage device of L1.

When performing step 630 the first time, processing as in step 330 is performed. Referring to FIG. 7, a search is performed along the topology connection starting from L1 and switch S1 can be obtained. A search is performed along the topology connection starting from L2 and switches S2 and S3 can be obtained. When performing the method the first time, an operating mode in which all searched switches (S1,S2,S3 in FIG. 4) are switched off is employed by default. In addition, assuming that in the example of FIG. 7, when performing the process flow 600, switches S5 and S6 are also switched off, the coloring algorithm is performed in an operating mode in which switches S1,S2,S3,S5,S6 are all switched off, so as to obtain outage scale {L1,L2,B2,B3,B4, S3,S6,X,Y, Z}.

In step 640, because device Z in the power supply guarantee device set is in outage scale {L1,L2,B2,B3,B4,S3,S6,X, Y,Z}, it is detected that there is a conflict.

In this case, an alarm is given, and then the process flow goes to step 650. In step 650, based on state information of the switches in the power grid, the method attempts to change the operating mode of the power grid. Specifically, the method attempts to switch on switches in switched-off state other than switches S1,S2,S3 in the power grid to reduce the outage scale.

The processing is based on the fact: there are some switches in the switched-off state in general in the power grid, and these switches are in the switched-off state due to the power grid reliability requirements or other reasons. In the example of FIG. 7, the switches S1,S2,S3 must be guaranteed to be switched off to ensure safety while maintaining line L1. However, switching on switches (for example S5,S6) that are currently in a switched-off state will reduce the outage scale, so that the power supply guarantee devices might be excluded from the outage scale and meet PSGRs or ORs at the same time.

In step 650, the operating mode is changed, that is, the switch states of switches S5,S6 are changed. After the operating mode is changed, the process flow goes to step 630. In step 630, the coloring algorithm is performed in the new operating mode to obtain a new outage scale. Then, in step 640 it is determined that for each device in said power supply guarantee device set if the device is included in the changed (new) power grid outage scale. Steps 630 to 650 are performed repeatedly until a power grid outage scale is found so that each device in the power supply guarantee device set is not included in the power grid outage scale, or until all the switch state combinations run out.

With respect to the power grid example in FIG. 7, if it is assumed that in step 650, the state of switches S5 and S6 is changed from a state in which S5 and S6 are both switched-off to a state in which S5 is switched-off and S6 is switched-on, then in the following step 630, an outage scale {L1,L2, B2,B3,B4,S3,S6,X,Y,Z} is obtained based on the operating mode, and the outage scale is the same as the original outage scale, so it still has conflict with PSGR.

Then, in the next cycle, if it is assumed that in step 650, the state of S5 and S6 is changed from a state in which S5 is switched-off and S6 is switched-on to a state in which S5 is switched-on and S6 is switched-off, then in the following step 630, an outage scale {L1,L2,B2,B3,S3,X,Y,Z} is obtained based on the operating mode, and though the outage scale is smaller than the original outage scale, it still has conflict with the PSGR since the outage scale still includes user Z.

Then, on the assumption that in step 650, the state of S5 and S6 is changed from a state in which S5 is switched-off and S6 is switched-on to a state in which S5 and S6 are both switched-on, then in the following iteration of step 630, an outage scale {L1,L2,B2,X,Y} is obtained based on the operating mode. In the following step 640, it is judged that there is not a conflict. Based on the judgment, remote control is performed at planned timings, so that switches S1,S2,S3 are set to be switched-off and switches S5,S6 are set to be switched-on. As such, not only PSGRs but also ORs are satisfied. Thus, the invention provides a capability of seeking an optimized non-conflict operation mode when a conflict is found.

If after a plurality of cycles, in step 650 all feasible state combinations of switches except switches that must be switched-off (S1,S2,S3, in the example of FIG. 7) are tested but a non-conflict operating mode is not found yet, then the process flow 600 ends. In this case, the only way to avoid a conflict is for the power grid dispatchers to manually adjust the outage plan.

Figure 8:
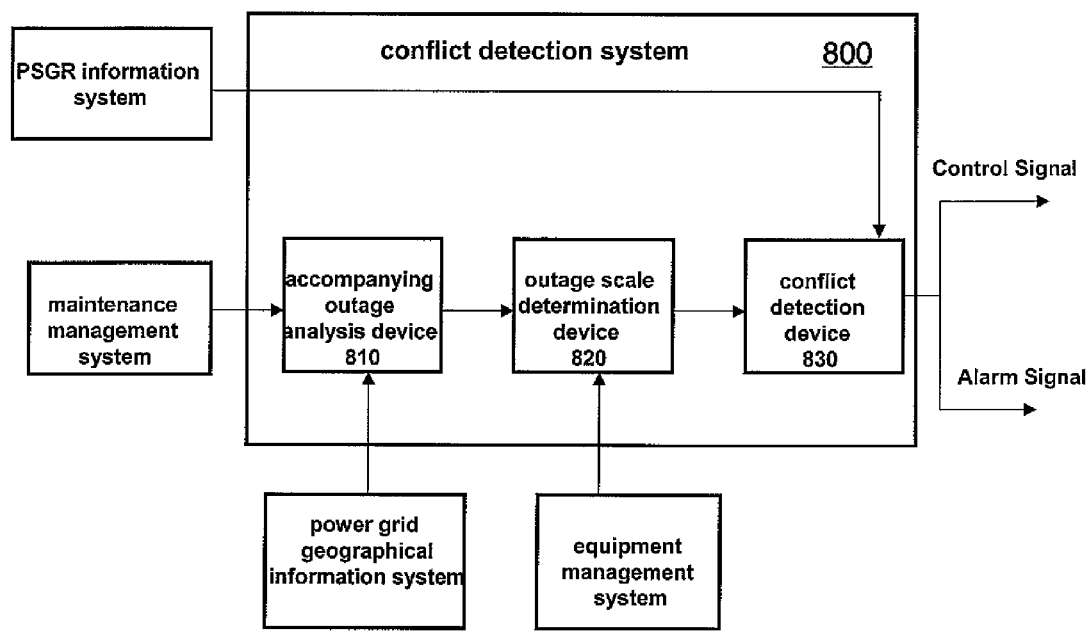
FIG. 8 is a block diagram of a conflict detection system according to one embodiment of invention.

FIG. 8 illustrates a conflict detection system 800 according to one embodiment of the invention. The conflict detection system 800 is used to detect conflicts between PSGRs and ORs in a power grid, and includes an accompanying outage analysis device 810, an outage scale determination device 820 and a conflict detection device 830.

FIG. 8 also illustrates a power supply guarantee request (PSGR) information system, a maintenance management system, a power grid geographical information system and an equipment management system. The power supply guarantee request information system manages and stores PSGR related data. The maintenance management system manages and stores OR related data. The power grid geographical information system manages and stores geographical information of electric power devices in the power grid. The equipment management system manages and stores topology information of the power grid. Though in drawings these four systems are shown as four separate modules, those skilled in the art can understand that these modules could be combined to form one, two, three or any number of modules. Any kind of combination of hardware and software can be used by the four systems, as long as they can provide PSGRs, ORs, geographical system information and topology information. For example, the data of the four systems can be stored in the same database, and the conflict detection system of the invention can obtain all necessary data from the database. Thus, module division for the system in FIG. 8 should not be regarded as any limitation to the invention.

In FIG. 8, the conflict detection system 800 comprises an accompanying outage analysis device 810, an outage scale determination device 820 and a conflict detection device 830.

The accompanying outage analysis device 810 receives an outage device set including OR related devices from the power grid management information system (maintenance management system), and uses geographical information relating to devices in power grid obtained from the power grid management information system (power grid geographical information system) to determine an outage device set further including accompanying outage devices. The new outage device set includes devices that were in the original outage device set received and also the accompanying outage devices. The accompanying outage devices are devices which need to be cut off of power together with devices in original outage device set. Outage device set determination processing performed by the accompanying outage analysis device 810 is the same as the above processing performed in step 320, thus a description for it will be omitted here.

The outage scale determination device 820 uses topology information about the power grid obtained from the power grid management information system (equipment management system) to determine a power grid outage scale in which all of the devices in the outage device set determined by the accompanying outage analysis device 810 can be in outage. Power grid outage scale determination processing performed by the outage scale determination device 820 is the same as the above processing performed in step 330, thus a description for it will be omitted here. The power grid outage scale determined by the outage scale determination device 820 is based on the utilization of an operating mode in which all searched switches (the search is started from outage devices based on topology, referring to the search explained in step 330) are switched off.

The conflict detection device 830 receives a power supply guarantee device set including the PSGR related devices from the power grid management information system (power supply guarantee information system), and judges, for each device in the power supply guarantee device set, if the device is include in the power grid outage scale determined by the outage scale determination device 820.

When the conflict detection device 830 judges that a conflict exists, then, for example, an alarm signal is given and the outage plan is adjusted manually by power grid dispatchers to avoid the conflict. On the other hand, if the conflict detection device 830 judges there is not a conflict, then the conflict detection system 800 can send out a control signal and perform remote control for searched switches at planned timings to switch off all these switches to perform an outage according to the power grid outage scale so that a fully automatic control is achieved.

Figure 9:
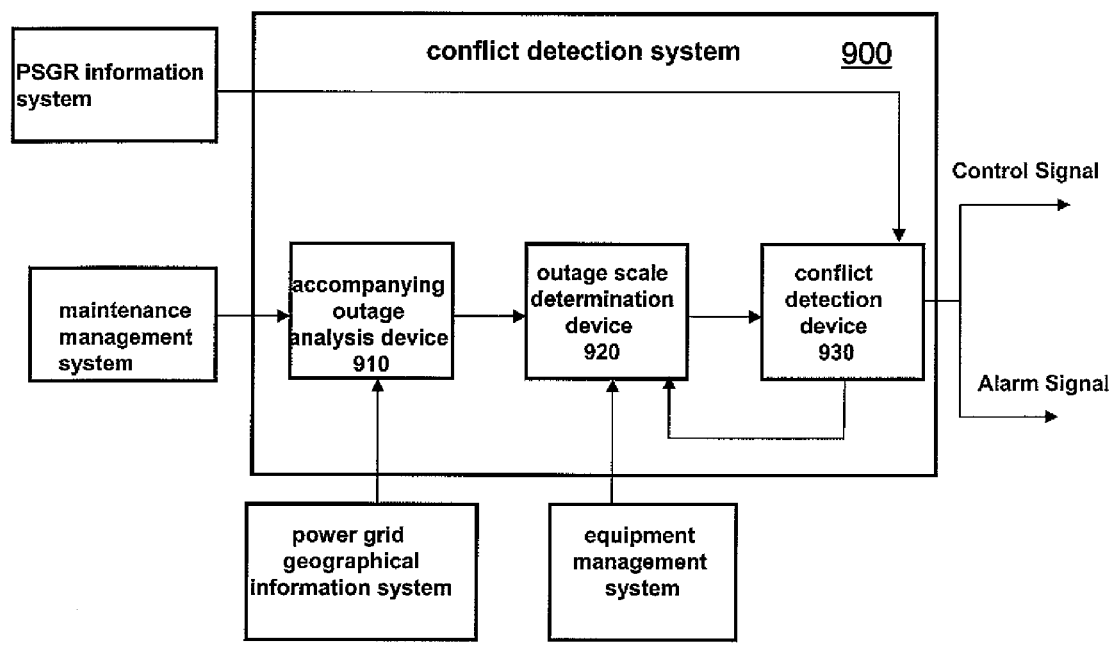
FIG. 9 is a block diagram of a conflict detection system according to another embodiment of invention.

FIG. 9 illustrates a conflict detection system 900 according to another embodiment of the invention. In FIG. 9, the conflict detection system 900 comprises an accompanying outage analysis device 910, an outage scale determination device 920 and a conflict detection device 930. The accompanying outage analysis device 910 has the same function as that of accompanying outage analysis device 810 in FIG. 8, and the outage scale determination device 920 and conflict detection device 930 have similar functions as those of the outage scale determination device 820 and the conflict detection device 830 in FIG. 8. The remaining parts in FIG. 9 are the same as corresponding parts in FIG. 8, thus a description for these parts will not be repeated here.

Hereinafter the difference between conflict detection system 900 and conflict detection system 800 will be explained.

In the first cycle, outage scale determination device 920 determines a power grid outage scale (here referred to as original power grid outage scale) in the same manner as outage scale determination device 820. In the case that conflict detection device 930 judges any device in the power supply guarantee device set is included in the original power grid outage scale determined by the outage scale determination device 920, besides sending out an alarm signal like conflict detection device 830, the conflict detection device 930 further informs the outage scale determination device 920 of the conflict.

The outage scale determination device 920 changes the original power grid outage scale by changing switch states of part (one or more) of the switches (switches other than the searched switches) in the power grid. Then, the conflict detection device 930 judges, for each device in the power supply guarantee device set received, if the device is included in the changed power grid outage scale. The outage scale determination device 920 repeatedly changes the power grid outage scale and the conflict detection device 930 repeatedly performs the judgment, until a power grid outage scale is found so that each device in the power supply guarantee device set is not included in the power grid outage scale, or until all the switch state combinations run out.

The conflict detection systems 800 and 900 may run in the similar timings as process flow 300 to achieve the above described functions.

Though in the invention with respect to geographic relationship only the same pole relationship, same room relationship and cross relationship are illustrated, other geographic relationships relating to maintenance and safety can be considered when determining the accompanying outage devices. For example, it can be determined that other electric power devices are excessively near to devices to be maintained exist, in accordance with geographic coordinates.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting a conflict between a power supply guarantee request (PSGR) and an outage request (OR) in a power grid, comprising:
   receiving a first outage device set including OR related devices and a power supply guarantee device set including PSGR related devices;
   using geographic information about devices in the power grid to determine a second outage device set, the second outage device set including devices in the first outage device set and accompanying outage devices having atleast one geographic relationship, identified in the geographic information, with devices in the first outage device set;
   using topology information about the power grid to determine a power grid outage scale that includes all of the devices in the second outage device set; and
   detecting, using a computer, for each device in the power supply guarantee device set, whether the device is included in the power grid outage scale, to determine if there is a conflict between the PSGR and the OR.

2. The method of claim 1, wherein the power grid outage scale corresponds to a switch state combination of respective switches in the power grid.

3. The method of claim 2, further comprising:
   remotely controlling the respective switches in the power grid to perform the outage according to the power grid outage scale in response to determining that each device in the power supply guarantee device set is not included in the power grid outage scale.

4. The method of claim 2, further comprising:
   changing the power grid outage scale by changing switch states of part of the switches in power grid in response to determining that any device in the power supply guarantee device set is included in the power grid outage scale.

5. The method of claim 4, further comprising:
judging, for each device in the power supply guarantee device set, whether the device is included in the changed power grid outage scale.

6. The method of claim 5, further comprising:
repeating the changing and judging steps until a power grid outage scale is found where each device in the power supply guarantee device set is not included in the power grid outage scale or until all the switch state combinations run out.

7. The method of claim 1, further comprising:
issuing a conflict alarm in response to determining that any device in the power supply guarantee device set is included in the power grid outage scale.

8. The method of claim 1, wherein the method is performed at specific time points including a power supply guarantee start timing, a power supply guarantee end timing, and outage start timing and outage ending time between the power supply guarantee start timing and the power supply guarantee end timing.

9. The method of claim 1, wherein the method is performed once per day.

10. The method of claim 1, wherein the at least one geographic relationship is selected from a same pole relationship, same room relationship, cross relationship, and combinations thereof.

11. The method of claim 1, wherein the at least one geographic relationship is determined by comparison of the geographic coordinates of the accompanying outage devices and the devices in the first outage device set.

\* \* \* \* \*